(12) United States Patent
Knight

(10) Patent No.: US 6,210,297 B1
(45) Date of Patent: Apr. 3, 2001

(54) TRANSMISSION HAVING TORQUE CONVERTER AND PLANETARY GEAR TRAIN

(75) Inventor: Irwin W. Knight, Belleville (CA)

(73) Assignee: Ivat Technologies Inc., Belleville (CA)

( * ) Notice: Subject to any disclaimer, the term of this patent is extended or adjusted under 35 U.S.C. 154(b) by 0 days.

(21) Appl. No.: 08/111,861

(22) Filed: Aug. 26, 1993

(30) Foreign Application Priority Data

Dec. 10, 1992 (CA) .................................................. 2085022

(51) Int. Cl.[7] .................................................. F16H 41/00
(52) U.S. Cl. .................................................. 475/35
(58) Field of Search .................................................. 475/35, 47

(56) References Cited

U.S. PATENT DOCUMENTS

| | | |
|---|---|---|
| 24,101 | 5/1859 | Colton . |
| 1,223,259 | 4/1917 | Cottam . |
| 1,366,325 | 1/1921 | Perin . |
| 2,528,314 | 10/1950 | Langdon . |
| 2,989,596 | 6/1961 | Lee et al. . |
| 3,163,056 | 12/1964 | Clarke . |
| 3,171,299 * | 3/1965 | Miner ........................... 475/47 |
| 3,330,171 | 7/1967 | Nasvytis . |
| 4,007,649 | 2/1977 | Stirland . |
| 4,472,984 * | 9/1984 | Cook ........................... 475/35 |
| 4,685,354 | 8/1987 | McCabria . |
| 4,759,229 | 7/1988 | Takahashi et al. . |
| 4,983,151 | 1/1991 | Pires . |

FOREIGN PATENT DOCUMENTS 1209435  3/1960 (FR) .
1554182  10/1979 (GB) .

OTHER PUBLICATIONS

Print–out of U.S. patents uncovered in search conducted by the Canadian Industrial Innovation Centre, Waterloo, Ontario, Canada.
Advertisement of Epilogics, Inc. of Los Gatos, CA entitled "The Perfect Transmission".
"Revolutionary Transmission Demonstrated", copied from Santa Cruz Sentinel, Aug. 27, 1989.
"Gearing for the Infinite", by Stuart F. Brown, *Popular Science* (Automotive Newsfront), Aug. 1992.
"A Geared Neutral Transmission", by Dan McCosh, Popular Science (Automotive Newsfront), Sep. 1991, pp. 31 and 35.
"Sliding Pins Shift CVT Speeds", Machine Design (News Trends), Apr. 25, 1985, p. 40.
"New Transmission System Promises Smooth Driving, Increased Economy", *Business Japan*, Mar. 1984, p. 103.
Mechanisms & Dynamics of Machinery 4th Ed Hamilton H Mabie.*
Standard Handbook of Machine Design Joseph E Shigley.*

* cited by examiner

*Primary Examiner*—Dirk Wright

(57) ABSTRACT

The automatic transmission comprises a torque converter and a planetary gear train. The gear train includes a first sun gear which is keyed to the output shaft of the torque converter. A first planetary gear meshes with the sun gear and that gear is keyed to an axle. The axle is mounted for rotation to a carrier and the carrier is rotated by the input shaft of the torque converter so that as the carrier rotates so too does the axle. A second planetary gear is also keyed to the axle and that gear meshes with a second sun gear. The latter sun gear rotates a drive shaft.

30 Claims, 3 Drawing Sheets

TRANSMISSION HAVING TORQUE CONVERTER AND PLANETARY GEAR TRAIN

BACKGROUND OF THE INVENTION

This invention relates to automatic transmissions and more particularly to an automatic transmission having a torque converter and a planetary gear train.

Known automatic transmissions use torque-converter couplings with planetary gear trains. The gear trains can supply one or more gear reductions and reverse, depending upon the design, by simultaneously engaging or locking various elements of the planetary systems.

Automatic control of such transmissions is achieved by a complicated arrangement of disc clutches or brake bands which lock the various elements. The elements are operated by oil pressure and are regulated by governors. As the vehicle accelerates, the transmission causes shifts to occur. A shift is usually accompanied by a drop in power to the wheels of the vehicle and by vibration and hesitation. Shifts can be annoying and disconcerting to the operator of the vehicle particularly where they occur frequently.

SUMMARY OF THE INVENTION

It is an object of this invention to provide an automatic transmission which has no shift points and which is stepless and variable in operation.

It is another object of the invention to provide an automatic transmission which has a torque converter and a planetary gear train and which lacks the complicated arrangement of brake bands, valves, governors and the large number of other moving parts found in a conventional automatic transmission.

These and other objects are accomplished by the combination of a torque converter having input and output shafts and a planetary gear train. The combination comprises a first sun gear fixedly mounted to the output shaft; a first planetary gear meshing with the sun gear; a carrier to which the planetary gear is mounted for rotation and which is rotated by the input shaft; a second planetary gear rotated by the first planetary gear; and a drive shaft in co-axial alignment with the output shaft and having a second sun gear which is fixedly mounted thereon and which meshes with the second planetary gear.

DESCRIPTION OF THE DRAWINGS

The combination of torque converter and planetary gear train of the invention is described with reference to the accompanying drawings in which.

Like reference characters refer to like parts throughout the description of the drawings.

DESCRIPTION OF THE PREFERRED EMBODIMENT

Figure 1:
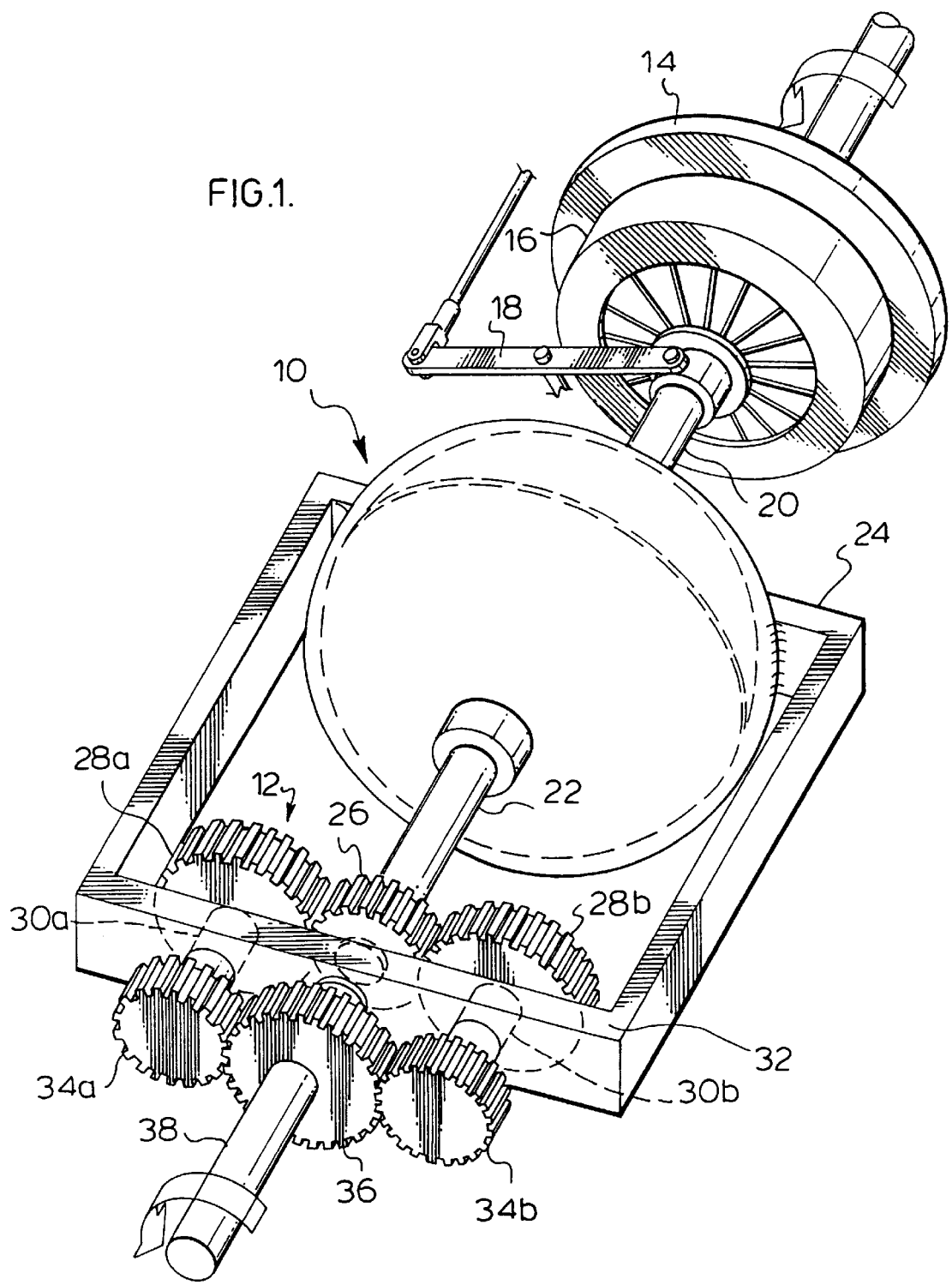
FIG. 1 is a perspective view of the combination shown in conjunction with a fly wheel, clutch and throw-out gear of a conventional power train.
Figure 2:
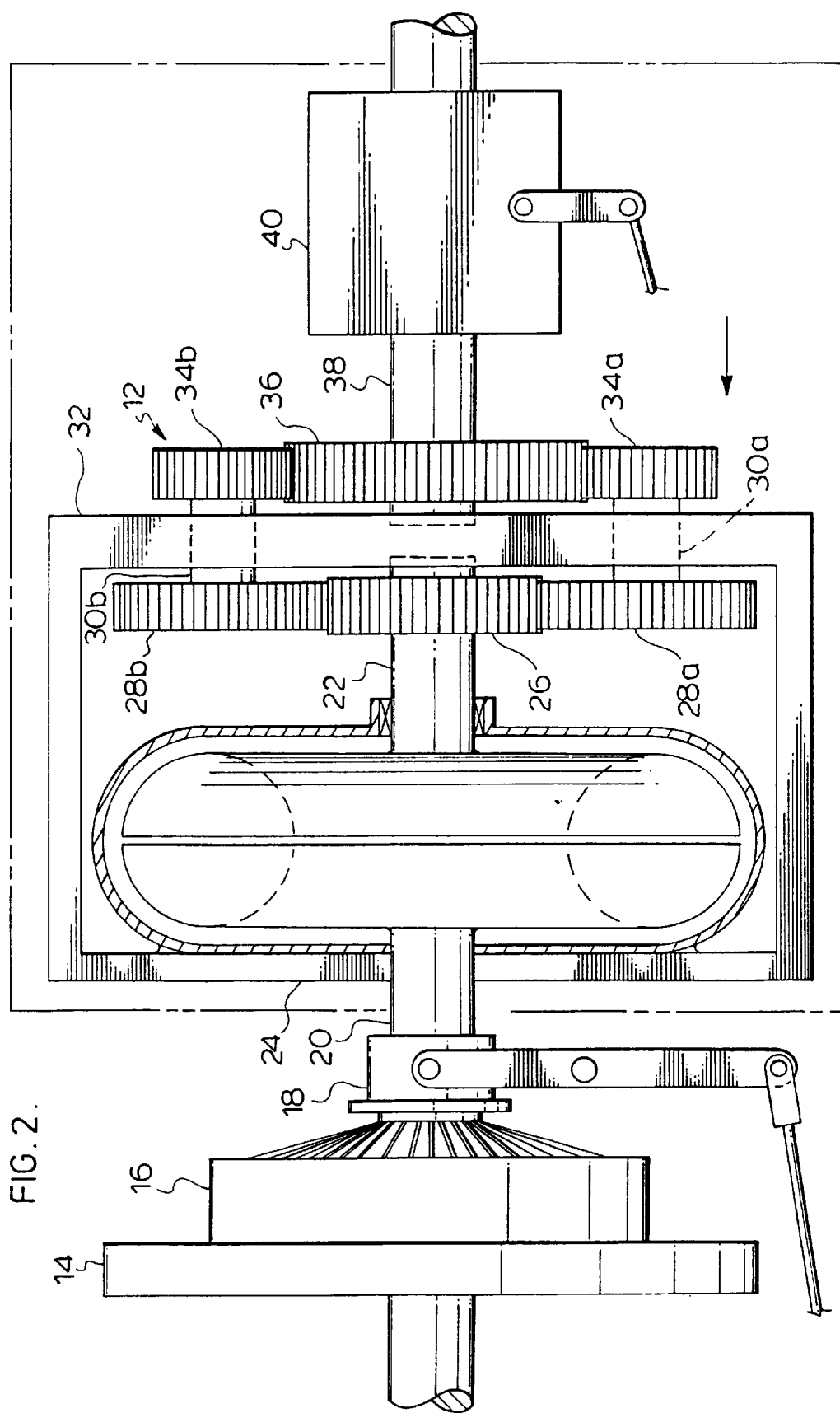
FIG. 2 is a plan view of the components illustrated in FIG. 1, shown partly cut away, together with a conventional reversing mechanism.

With reference to FIGS. 1 and 2, a torque converter, indicated generally 10 and a planetary gear train, generally 12 are shown in conjunction with a flywheel 14, a clutch 16 and a throw-out bearing unit 18. The flywheel, clutch and bearing unit are of conventional construction.

The torque converter may be any device which changes the torque speed or mechanical advantage between an input shaft and an output shaft. The illustrated torque converter is of conventional construction where the input shaft 20 drives the pump impeller and eiergy is transferred from the impeller to the fluid within the converter as the pump builds up speed. The fluid flows from the inlet radius to the outlet radius and discharges from the impeller. From the impeller, the fluid enters the turbine and causes the turbine runner to rotate with resulting rotation of the output shaft 22.

The outer shell or body 24 of the torque converter is connected to the input shaft 20 so that as the shaft rotates so too does the body.

The planetary gear train includes a first sun gear 26 which is keyed to output shaft 22. The sun gear meshes with a pair of first planetary gears 28a,b. As illustrated the latter gears are disposed on diametrically opposite sides of the sun gear. Each planetary gear is keyed to a separate planetary axle or shaft 30a,b and the shafts are mounted in bearings in a carrier plate 32. The carrier plate is integral with the body 24 of the torque converter so that as the body rotates so too does the carrier 32.

Preferably the carrier will be in the form of a hollow cylinder within which the torque converter and gears 26 and 28 are located. The cylinder contains oil to lubricate the gears.

Keyed to each planetary shaft on the side of the carrier opposite the first planetary gear is a second planetary gear 34a,b. The latter gears mesh with a second sun gear 36. Provision may be made to enclose gears 34 and 36 in the cylinder in which the torque converter and gears 26 and 28 are located. In such case the side walls of the cylinder must be extended beyond the latter gears and an end wall be attached to the cylinder through which shaft 38 projects.

The sun gear is keyed to a drive shaft 38 and that shaft drives a conventional reversing mechanism 40. Drive shaft 38 and output shaft 22 are in co-axial alignment but are not connected to each other.

Sun gear 26 and second planetary gears 34 have outer diameters of equal length and have an equal number of teeth. Similarly sun gear 36 and the first planetary gears 28 have outer diameters of equal length and have the same number of teeth.

Preferably the sun gear 26 has 24 teeth and the first planetary gears 28 have 36 teeth. As such, for every revolution of sun gear 26, the planetary gears 28 rotate $24/36$ or $2/3$rds of a revolution. The second planetary gears will likewise rotate $2/3$rds of a revolution thereby causing the sun gear 36 to rotate $2/3 \times 24/36$ or $4/9$ths of a revolution. Thus for 2 ¼ revolutions of output shaft 22, the drive shaft 38 rotates once.

Gears of such dimensions are appropriate in motor vehicles that have small to medium sized engines of no more than about 100 horsepower. In vehicles having larger engines gears of different dimensions may be more appropriate.

Figure 4:
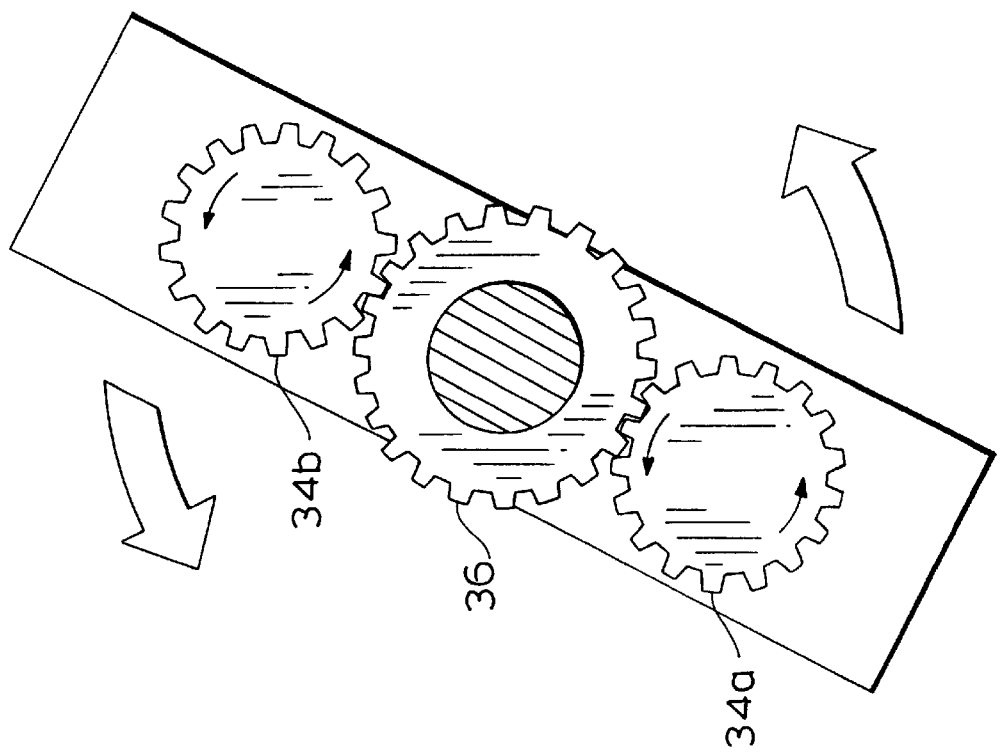
FIG. 4 is another elevation of the planetary gear train.
Figure 3:
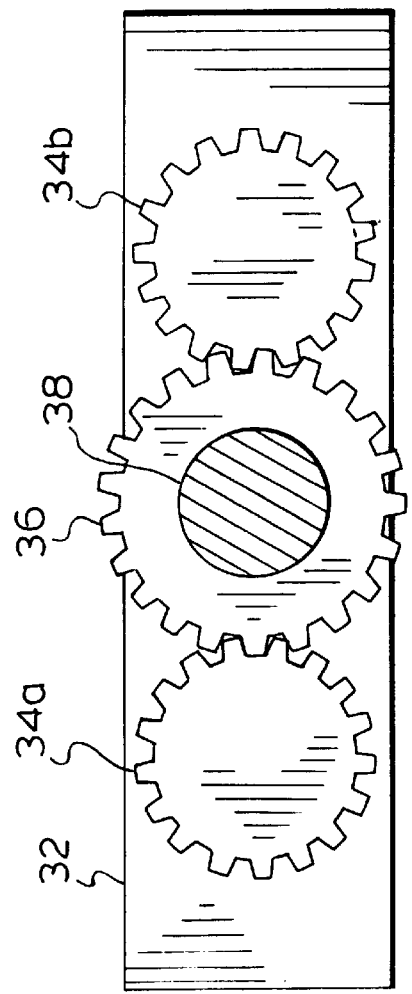
FIG. 3 is an elevation of a portion of the planetary gear train.

In operation and with reference to FIGS. 3 and 4, as the carrier 32 is rotated by the input shaft 20, the planetary gears 34a,b rotate freely about sun gear 36. Similarly planetary gears 28a,b rotate freely about sun gear 26. Such motion imparts little or no torque to the sun gears and normally occurs when the engine is idling.

When the engine is in gear, torque will be applied to the output shaft 22 by the torque converter and that torque will be applied to the planetary gear train. If the gears have the dimensions described in the preceding paragraphs, the gear train will increase the torque by 2¼ times.

It will be understood of course that modifications can be made in the preferred embodiments illustrated and described herein without departing from the scope and purview of the invention as defined in the appended claims.

What is claimed is:

1. The combination of a torque converter and a planetary gear train,
   torque converter comprising:
   an outer body,
   an input shaft fixedly attached to the body so that the body rotates with the input shaft,
   an impeller driven by the input shaft,
   a turbine coupled to the impeller, and
   an output shaft driven by the turbine; and
   the planetary gear train comprising:
   a first sun gear fixedly mounted to the output shaft,
   a first planetary gear meshing with the first sun gear,
   a carrier to which the first planetary gear is mounted for rotation, the carrier being fixedly attached to the body and rotated with the body by the input shaft,
   a second planetary gear rotated by the first planetary gear,
   a drive shaft in co-axial alignment with the output shaft, and
   a second sun gear fixedly mounted on the drive shaft and meshing with the second planetary gear,
   wherein the carrier encases the first sun gear and the first planetary gear.

2. The combination as claimed in claim 1 wherein the number of teeth formed on said first sun gear and on each of said second planetary gears is the same.

3. The combination as claimed in claim 1 wherein the number of teeth formed on said second sun gear and on each of said first planetary gears is the same.

4. The combination as claimed in claims 1 wherein the number of teeth formed on said first sun gear and on each of said second planetary gears is the same and the number of teeth formed on said second sun gear and on each of said first planetary gears is the same.

5. The combination as claimed in claim 1, wherein the ratio of the number of teeth on said first sun gear to the number of teeth on said first planetary gear is approximately 2:3.

6. The combination as claimed in claim 1, wherein the number of teeth formed on said first sun gear and on each of said second planetary gears is the same and wherein the ratio of the number of teeth on said first sun gear to the number of teeth on said first planetary gear is approximately 2:3.

7. The combination as claimed in claim 1, wherein the number of teeth formed on said second sun gear and on each of said first planetary gears is the same and wherein the ratio of the number of teeth on said second sun gear to the number of teeth on said second planetary gear is approximately 3:2.

8. The combination as claimed in claim 1, wherein the number of teeth formed on said first sun gear and on each of said second planetary gears is the same and the number of teeth formed on said second sun gear and on each of said first planetary gears is the same, wherein the ratio of the number of teeth on said first sun gear to the number of teeth on said first planetary gear is approximately 2:3 and wherein the ratio of the number of teeth on said second sun gear to the number of teeth on said second planetary gear is approximately 3:2.

9. The combination as claimed in claim 1, wherein the carrier is hollow and includes a side wall and first and second end walls within which the first sun gear and the first planetary gear are located; the first end wall of the carrier is fixedly attached to the body of the torque converter; the second sun gear and the second planetary gear are located exterior to the carrier; and the drive shaft projects beyond the second end wall.

10. The combination of claim 9, wherein the torque converter is located within the hollow carrier.

11. The combination of a torque converter and a planetary gear train,
    the torque converter comprising:
    an outer body,
    an input shaft fixedly attached to the body so that the body rotates with the input shaft,
    an impeller driven by the input shaft,
    a turbine coupled to the impeller, and
    an output shaft driven by the turbine; and
    the planetary gear train comprising:
    a first sun gear fixedly mounted to the output shaft,
    a first planetary gear meshing with the first sun gear,
    a planetary shaft on which the first planetary gear is fixedly mounted,
    a carrier on which the planetary shaft is mounted for rotation, the carrier being fixedly attached to the body and rotated with the body by the input shaft,
    a second planetary gear fixedly mounted to the planetary shaft,
    a drive shaft in co-axial alignment with the output shaft, and
    a second sun gear fixedly mounted on the drive shaft and meshing with the second planetary gear;
    wherein the carrier encases the first sun gear and the first planetary gear.

12. The combination as claimed in claim 11 wherein the number of teeth formed on said first sun gear and on each of said second planetary gears is the same.

13. The combination as claimed in claim 11 wherein the number of teeth formed on said second sun gear and on each of said first planetary gears is the same.

14. The combination as claimed in claim 11, wherein the number of teeth formed on said first sun gear and on each of said second planetary gears is the same and the number of teeth formed on said second sun gear and on each of said first planetary gears is the same.

15. The combination as claimed in claim 11, wherein the ratio of the number of teeth on said first sun gear to the number of teeth on said first planetary gear is approximately 2:3.

16. The combination as claimed in claim 11, wherein the number of teeth formed on said first sun gear and on each of said second planetary gears is the same and wherein the ratio of the number of teeth on said first sun gear to the number of teeth on said first planetary gear is approximately 2:3.

17. The combination as claimed in claim 11, wherein the number of teeth formed on said second sun gear and on each of said first planetary gears is the same and wherein the ratio of the number of teeth on said second sun gear to the number of teeth on said second planetary gear is approximately 3:2.

18. The combination as claimed in claim 11, wherein the number of teeth formed on said first sun gear and on each of said second planetary gears is the same and the number of teeth formed on said second sun gear and on each of said first planetary gears is the same, wherein the ratio of the number of teeth on said first sun gear to the number of teeth on said first planetary tear is approximately 2:3 and wherein the ratio of the number of teeth on said second sun gear to the number of teeth on said second planetary gear is approximately 3:2.

19. The combination as claimed in claim 11, wherein the carrier is hollow and includes a side wall and first and second end walls within which the first sun gear and the first planetary gear are located; the first end wall of the carrier is fixedly attached to the body of the torque converter; the second sun gear and the second planetary gear are located exterior to the carrier; and the drive shaft projects beyond the second end wall.

20. The combination of claim 19, wherein the torque converter is located within the hollow carrier.

21. The combination of a torque onverter and a planetary gear train, the torgue converter comprising:
an outer body,
an input shaft fixedly attached to the body so that the body rotates with the input shaft,
an impeller driven by the input shaft,
a turbine coupled to the impeller, and
an output shaft driven by the tubine; and the planetary gear train comprising:
a first sun gear fixedly mounted to the output shaft,
a pair of first planetary gears meshing with the first sun gear and disposed on diametrically opposite sides thereof,
a pair of planetary shafts on each of which a respective one of the first planetary gears is fixedly mounted,
a carrier on which the planetary shafts are mounted for rotation, the carrier being fixedly attached to the body and rotated with the body by the input shaft,
a pair of second planetary gears, each of which is fixedly mounted to a respective one of the planetary shafts,
a drive shaft in co-axial alignment with the output shaft, and
a second sun gear fixedly mounted on the drive shaft and meshing with the second planetary gears, the second planetary gears being on diametrically opposite sides of the second sun gear;
wherein the carrier encases the first sun gear and the pair of first planetary gears.

22. The combination as claimed in claim 21 wherein the number of teeth formed on said first sun gear and on each of said second planetary gears is the same.

23. The combination as claimed in claim 21 wherein the number of teeth formed on said first sun gear and on each of said first planetary gears is the same.

24. The combination as claimed in claim 21, wherein the number of teeth formed on said first sun gear and on each of said second planetary gears is the same and the number of teeth formed on said second sun gear and on each of said first planetary gears is the same.

25. The combination as claimed in claim 21, wherein the ratio of the number of teeth on said first sun gear to the number of teeth on said first planetary gear is approximately 2:3.

26. The combination as claimed in claim 21, wherein the number of teeth formed on said first sun gear and on each of said second planetary gears is the same and wherein the ratio of the number of teeth on said first sun gear to the number of teeth on said first planetary gear is approximately 2:3.

27. The combination as claimed in claim 21, wherein the number of teeth formed on said second sun gear and on each of said first planetary gears is the same and wherein the ratio of the number of teeth on said second sun gear to the number of teeth on said second planetary gear is approximately 3:2.

28. The combination as claimed in claim 21, wherein the number of teeth formed on said first sun gear and on each of said second planetary gears is the same and the numer of teeth formed on said second sun gear and on each of said first planetary gears is the same, wherein the ratio of the number of teeth on said first sun gear to the number of teeth on said first planetary gear is approximately 2:3 and wherein the ratio of the number of teeth on said second sun gear to the number of teeth on said second planetary gear is approximately 3:2.

29. The combination in claim 21, wherein the carrier is hollow and includes a side wall and first and second end walls iwthin which the first sun gear and the first planetary gears are located; the first end wall of the carrier is fixedly attached to the body of the torque converter; the second sun gear and the second planetary gears are located exterior to the carrier; and the drive shaft projects beyond the second end wall.

30. The combination of claim 29, wherein the torque converter is located within the hollow carrier.

* * * * *